United States Patent
Hsu

(10) Patent No.: US 8,485,547 B2
(45) Date of Patent: Jul. 16, 2013

(54) STROLLER HAVING SHOCK-ABSORBING FUNCTION

(75) Inventor: Chuan-Kai Hsu, Tainan (TW)

(73) Assignee: Wei Guan Products Co., Ltd, Shenzhen (CN)

( * ) Notice: Subject to any disclaimer, the term of this patent is extended or adjusted under 35 U.S.C. 154(b) by 40 days.

(21) Appl. No.: 13/313,142

(22) Filed: Dec. 7, 2011

(65) Prior Publication Data

US 2013/0147162 A1   Jun. 13, 2013

(51) Int. Cl.
*B62B 1/00*   (2006.01)

(52) U.S. Cl.
USPC ............ 280/647; 280/642; 280/650; 280/658

(58) Field of Classification Search
USPC ................. 280/647, 642, 657, 650, 658, 649, 280/47.38
See application file for complete search history.

(56) References Cited

U.S. PATENT DOCUMENTS

| | | | | |
|---|---|---|---|---|
| 4,191,397 A * | 3/1980 | Kassai | ............................ | 280/647 |
| 4,544,178 A * | 10/1985 | Al-Sheikh et al. | ............. | 280/642 |
| 6,523,853 B1 * | 2/2003 | Cheng | ............................ | 280/642 |
| 6,886,851 B2 * | 5/2005 | Chen | ............................. | 280/642 |
| 7,632,035 B2 * | 12/2009 | Cheng | .............................. | 403/98 |
| 7,780,183 B2 * | 8/2010 | Chen et al. | ..................... | 280/647 |
| 8,226,110 B2 * | 7/2012 | Liao | ............................... | 280/642 |
| 2010/0025968 A1 * | 2/2010 | Fritz et al. | ...................... | 280/647 |
| 2011/0084467 A1 * | 4/2011 | Liao | ............................... | 280/642 |

* cited by examiner

*Primary Examiner* — Hau Phan
(74) *Attorney, Agent, or Firm* — Alan Kamrath; Kamrath IP Lawfirm, P.A.

(57) ABSTRACT

A stroller includes a frame unit, two folding devices, and a wheel unit. The frame unit includes a rear support frame, an upper support frame and a lower support frame. Each of the folding devices includes a first shell, a second shell, a gear set, and a pulling mechanism. The gear set includes at least two first toothed members, a connecting rod, a second toothed member, and a fixing rod. The pulling mechanism includes a locking member, a locking rod, a tension spring, a pull member, a drive wire and a fastening member. The wheel unit includes a main shaft, a mounting seat, an elastic plate, a wheel bracket, a buffering spring, and two front wheels. The buffering spring is biased between the mounting seat and the wheel bracket to provide a shock-absorbing function to the front wheels.

2 Claims, 11 Drawing Sheets

STROLLER HAVING SHOCK-ABSORBING FUNCTION

BACKGROUND OF THE INVENTION

1. Field of the Invention

The present invention relates to a stroller and, more particularly, to a foldable stroller.

2. Description of the Related Art

A conventional stroller comprises a frame unit, and two folding devices connected with the frame unit. The frame unit includes a rear support frame, an upper support frame foldably connected with the rear support frame, and a lower support frame foldably connected with the rear support frame. Each of the upper support frame, the lower support frame and the rear support frame of the frame unit has a substantially U-shaped profile. The rear support frame of the frame unit has two opposite upper portions each provided with a rear connecting member and a lower portion provided with two rear wheels. The lower support frame of the frame unit is disposed at an inclined state and has two opposite upper portions each provided with a lower connecting member pivotally connected with the rear connecting member of the rear support frame and a lower portion provided with at least one front wheel. The upper support frame of the frame unit is disposed at an inclined state and has two opposite lower portions each provided with an upper connecting member pivotally connected with the rear connecting member of the rear support frame. Each of the folding devices is mounted between the upper support frame, the lower support frame and the rear support frame of the frame unit. Thus, when each of the folding devices is locked, the upper support frame and the lower support frame are locked onto the rear support frame, and when each of the folding devices is unlocked, the upper support frame and the lower support frame are released from and can be pivoted relative to the rear support frame so as to fold the frame unit.

However, the conventional stroller does not have a shock-absorbing function so that when the front wheel or the rear wheels are subjected to a force or vibration suddenly, the is directly transmitted to the frame unit, thereby easily causing an uncomfortable sensation to the baby placed in the frame unit. In addition, when the user is bending and moving the upper support frame and the lower support frame relative to the rear support frame to fold the frame unit, the user's fingers are easily clamped in or hurt by the clearance between the rear connecting member of the rear support frame and the upper connecting member of the upper support frame or the lower connecting member of the lower support frame during the folding process, thereby causing danger to the user.

BRIEF SUMMARY OF THE INVENTION

In accordance with the present invention, there is provided a stroller, comprising a frame unit, two folding devices connected with the frame unit, and a wheel unit connected with the frame unit. The frame unit includes a rear support frame, an upper support frame foldably connected with the rear support frame, and a lower support frame foldably connected with the rear support frame. The lower support frame of the frame unit has two opposite upper portions each provided with a lower connecting member which has two opposite sides. The upper support frame of the frame unit has a surface provided with an elongate slot. Each of the folding devices is mounted between the upper support frame, the lower support frame and the rear support frame of the frame unit. Each of the folding devices includes a first shell, a second shell combined with the first shell, a gear set mounted between the first shell and the second shell, and a pulling mechanism connected between the upper support frame of the frame unit and the gear set. The gear set of each of the folding devices includes at least two first toothed members mounted on the two opposite sides of the lower connecting member of the lower support frame, a connecting rod extending through the first toothed members, a second toothed member meshing with the first toothed members, and a fixing rod extending through the second toothed member. The pulling mechanism of each of the folding devices includes a locking member mounted between the first shell and the second shell, a locking rod mounted on the locking member and detachably locked onto the rear support frame of the frame unit, a tension spring mounted between the second toothed member of the gear set and the locking member and having a first end secured on the fixing rod of the gear set and a second end secured on the locking rod, a pull member movably mounted on the upper support frame of the frame unit, a drive wire having a first end provided with a retaining member abutting the locking member and a second end attached to the pull member, and a fastening member extended through the pull member, the elongate slot of the upper support frame and the second end of the drive wire. The second end of the drive wire of the pulling mechanism of each of the folding devices is connected with the pull member by the fastening member, and the fastening member is slidable in the elongate slot of the upper support frame to guide movement of the pull member on the upper support frame of the frame unit. Thus, when the upper support frame and the lower support frame of the frame unit are folded relative to the rear support frame of the frame unit, the first toothed members and the second toothed member of the gear set of each of the folding devices are rotated in concert with each other. The wheel unit is mounted on a lower portion of the lower support frame of the frame unit. The wheel unit includes a main shaft secured on the lower support frame of the frame unit and having a lower end provided with a locking groove, a mounting seat removably mounted on the main shaft, an elastic plate mounted on a bottom of the mounting seat and having a side provided with a locking piece detachably locked in the locking groove of the main shaft, a wheel bracket mounted on a lower portion of the mounting seat, a buffering spring mounted in the mounting seat and biased between the mounting seat and the wheel bracket, and two front wheels mounted on two opposite sides of the wheel bracket. Thus, when the locking piece of the elastic plate is detached from the locking groove of the main shaft, the mounting seat is removed from the main shaft, so that the wheel bracket and the front wheels are removed from the lower support frame of the frame unit.

Preferably, the rear support frame of the frame unit has two opposite upper portions each provided with a rear connecting member. The rear connecting member of the rear support frame has a periphery provided with at least one locking recess. The locking rod of the pulling mechanism of each of the folding devices is detachably locked in the locking recess of the rear connecting member of the rear support frame.

The primary objective of the present invention is to provide a foldable stroller having a shock-absorbing function.

According to the primary advantage of the present invention, when the front wheels are subjected to a force or vibration suddenly, the buffering spring between the mounting seat and the wheel bracket is compressed to provide a shock-absorbing function to the front wheels so as to reduce the vibration applied on the front wheels so that the front wheels are moved smoothly and stably.

According to another advantage of the present invention, the front wheels can be detached from the frame unit when not in use, thereby facilitating packaging, transportation and storage of the stroller.

According to a further advantage of the present invention, the user only needs to push the elastic plate to detach the front wheels from the frame unit so that the front wheels can be detached from the frame unit easily and quickly.

According to a further advantage of the present invention, the user only needs to pull the pull member of each of the folding devices to unlock and collapse the upper support frame and the lower support frame so as to fold the frame unit so that the frame unit can be folded easily and quickly.

According to a further advantage of the present invention, when the second toothed member and the first toothed members of each of the folding devices are rotated in concert with each other, the connecting rod of each of the folding devices is slidable in the guide slot of the lower connecting member to guide rotation of the second toothed member and the first toothed members of each of the folding devices so that the second toothed member and the first toothed members of each of the folding devices are rotated smoothly and stably.

According to a further advantage of the present invention, the first shell and the second shell of each of the folding devices encompass the upper connecting member of the upper support frame, the lower connecting member of the lower support frame and the rear connecting member of the rear support frame to prevent the upper support frame and the lower support frame from clamping or hurting the user during the folding process.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
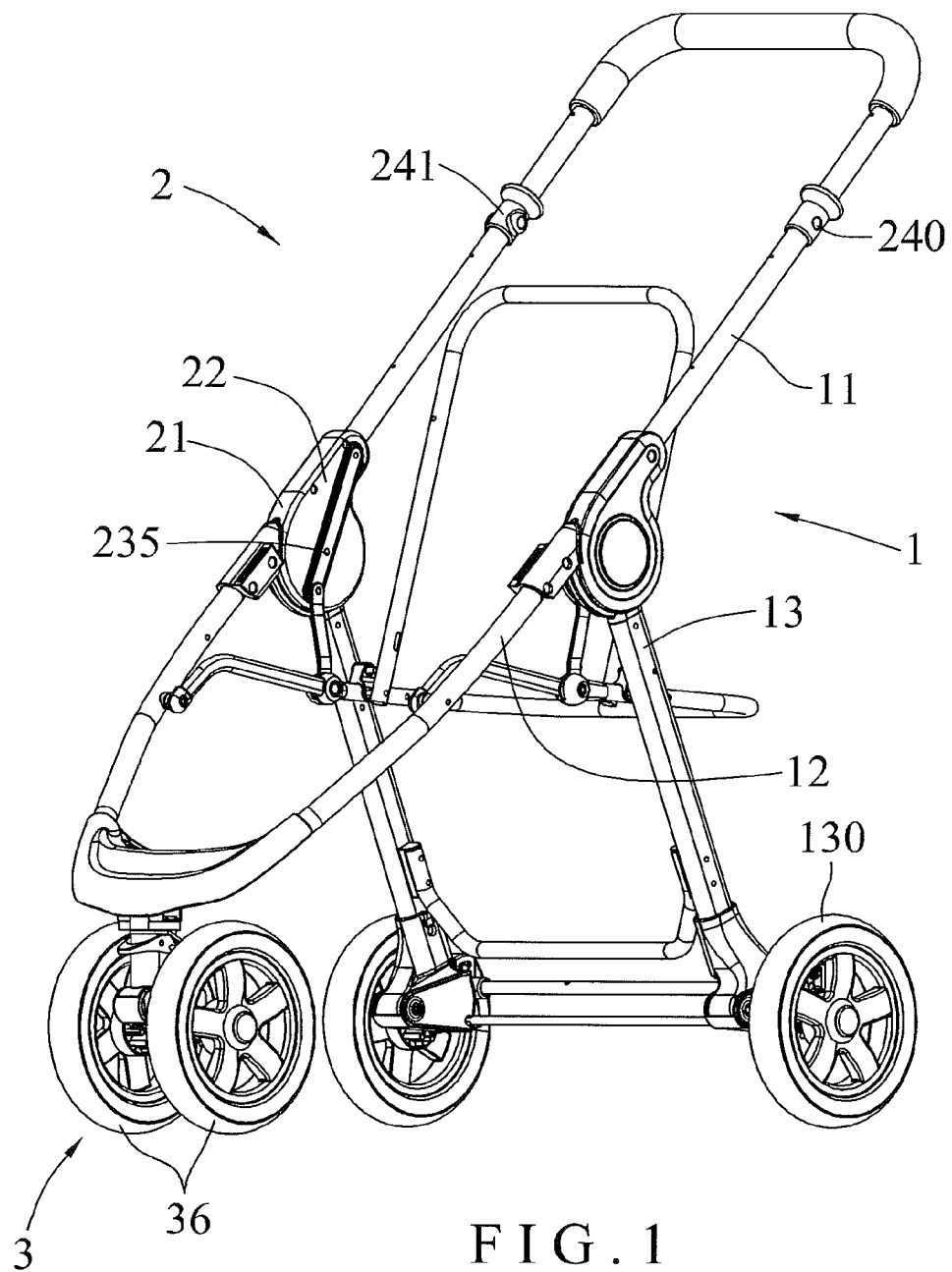
FIG. 1 is a perspective view of a stroller in accordance with the preferred embodiment of the present invention.

Referring to the drawings and initially to FIGS. 1-4, a stroller in accordance with the preferred embodiment of the present invention comprises a frame unit 1, two folding devices 2 connected with the frame unit 1, and a wheel unit 3 connected with the frame unit 1.

The frame unit 1 includes a rear support frame 13, an upper support frame 11 foldably connected with the rear support frame 13, and a lower support frame 12 foldably connected with the rear support frame 13. Each of the upper support frame 11, the lower support frame 12 and the rear support frame 13 of the frame unit 1 has a substantially U-shaped profile. The lower support frame 12 of the frame unit 1 is disposed at an inclined state and has two opposite upper portions each provided with a lower connecting member 121 which has two opposite sides. The lower connecting member 121 of the lower support frame 12 has a surface provided with an arcuate guide slot 1212 and has an end provided with a lower connecting hole 1211. The upper support frame 11 of the frame unit 1 is disposed at an inclined state and has a surface provided with an elongate slot 111. The upper support frame 11 of the frame unit 1 has two opposite lower portions each provided with an upper connecting member 112. The upper connecting member 112 of the upper support frame 11 has two opposite sides each provided with an upper connecting hole 1121. The rear support frame 13 of the frame unit 1 has two opposite upper portions each provided with a rear connecting member 131 and a lower portion provided with two rear wheels 130. The rear connecting member 131 of the rear support frame 13 has a periphery provided with at least one locking recess 1311. The rear connecting member 131 of the rear support frame 13 has two opposite sides each provided with a rear connecting hole 1312.

Each of the folding devices 2 is mounted between the upper support frame 11, the lower support frame 12 and the rear support frame 13 of the frame unit 1. Each of the folding devices 2 includes a first shell 21, a second shell 22 combined with the first shell 21, a gear set 23 mounted between the first shell 21 and the second shell 22, and a pulling mechanism 24 connected between the upper support frame 11 of the frame unit 1 and the gear set 23.

The first shell 21 and the second shell 22 of each of the folding devices 2 encompass the upper connecting member 112 of the upper support frame 11, the lower connecting member 121 of the lower support frame 12 and the rear connecting member 131 of the rear support frame 13 of the frame unit 1. The first shell 21 of each of the folding devices 2 has an inner side provided with a fixing bore 211. The second shell 22 of each of the folding devices 2 has a surface provided with a through bore 221.

The gear set 23 of each of the folding devices 2 includes at least two first toothed members 231 mounted on the two opposite sides of the lower connecting member 121 of the lower support frame 12, a connecting rod 232 extending through the first toothed members 231, a second toothed member 233 meshing with the first toothed members 231, and a fixing rod 234 extending through the second toothed member 233. Each of the first toothed members 231 of the gear set 23 of each of the folding devices 2 has a surface provided with a through hole 2311. The connecting rod 232 of the gear set 23 of each of the folding devices 2 is extended through the through hole 2311 of each of the first toothed members 231 and the guide slot 1212 of the lower connecting member 121 of the lower support frame 12. The second toothed member 233 of the gear set 23 of each of the folding devices 2 has a forked periphery provided with two apertures 2331. The second toothed member 233 of the gear set 23 of each of the folding devices 2 has a central portion periphery provided with a pivot hole 2332. The fixing rod 234 of the gear set 23 of each of the folding devices 2 is extended through the apertures 2331 of the second toothed member 233.

Thus, when the upper support frame 11 and the lower support frame 12 of the frame unit 1 are folded relative to the rear support frame 13 of the frame unit 1, the first toothed members 231 and the second toothed member 233 of the gear set 23 of each of the folding devices 2 are rotated in concert with each other.

The pulling mechanism 24 of each of the folding devices 2 includes a locking member 243 mounted between the first shell 21 and the second shell 22, a locking rod 244 mounted on the locking member 243 and detachably locked onto the rear support frame 13 of the frame unit 1, a tension spring 245 mounted between the second toothed member 233 of the gear set 23 and the locking member 243 and having a first end secured on the fixing rod 234 of the gear set 23 and a second end secured on the locking rod 244, a pull member 241 movably mounted on the upper support frame 11 of the frame unit 1, a drive wire 242 having a first end provided with a retaining member 2421 abutting the locking member 243 and a second end attached to the pull member 241, and a fastening member 240 extended through the pull member 241, the elongate slot 111 of the upper support frame 11 and the second end of the drive wire 242. The locking member 243 of the pulling mechanism 24 of each of the folding devices 2 has a surface provided with a fixing hole 2431 and has an interior provided with a passage 2432. The locking rod 244 of the pulling mechanism 24 of each of the folding devices 2 is secured in the fixing hole 2431 of the locking member 243 and has two opposite ends each protruding outward from the fixing hole 2431 of the locking member 243. The locking rod 244 of the pulling mechanism 24 of each of the folding devices 2 is detachably locked in the locking recess 1311 of the rear connecting member 131 of the rear support frame 13. The drive wire 242 of the pulling mechanism 24 of each of the folding devices 2 is extended through the upper connecting member 112 of the upper support frame 11 and the passage 2432 of the locking member 243. The second end of the drive wire 242 of the pulling mechanism 24 of each of the folding devices 2 is connected with the pull member 241 by the fastening member 240, and the fastening member 240 is slidable in the elongate slot 111 of the upper support frame 11 to guide movement of the pull member 241 on the upper support frame 11 of the frame unit 1.

The wheel unit 3 is mounted on a lower portion of the lower support frame 12 of the frame unit 1. The wheel unit 3 includes a main shaft 31 secured on the lower support frame 12 of the frame unit 1 and having a lower end provided with a locking groove 311, a mounting seat 32 removably mounted on the main shaft 31, an elastic plate 33 mounted on a bottom of the mounting seat 32 and having a side provided with a locking piece 331 detachably locked in the locking groove 311 of the main shaft 31, a wheel bracket 35 mounted on a lower portion of the mounting seat 32, a buffering spring 34 mounted in the mounting seat 32 and biased between the mounting seat 32 and the wheel bracket 35, and two front wheels 36 mounted on two opposite sides of the wheel bracket 35. The main shaft 31 of the wheel unit 3 is extended through the mounting seat 32 and the wheel bracket 35. The elastic plate 33 of the wheel unit 3 has a substantially inverted V-shaped profile. Thus, when the locking piece 331 of the elastic plate 33 is detached from the locking groove 311 of the main shaft 31, the mounting seat 32 is removed from the main shaft 31, so that the wheel bracket 35 and the front wheels 36 are removed from the lower support frame 12 of the frame unit 1.

Figure 2:
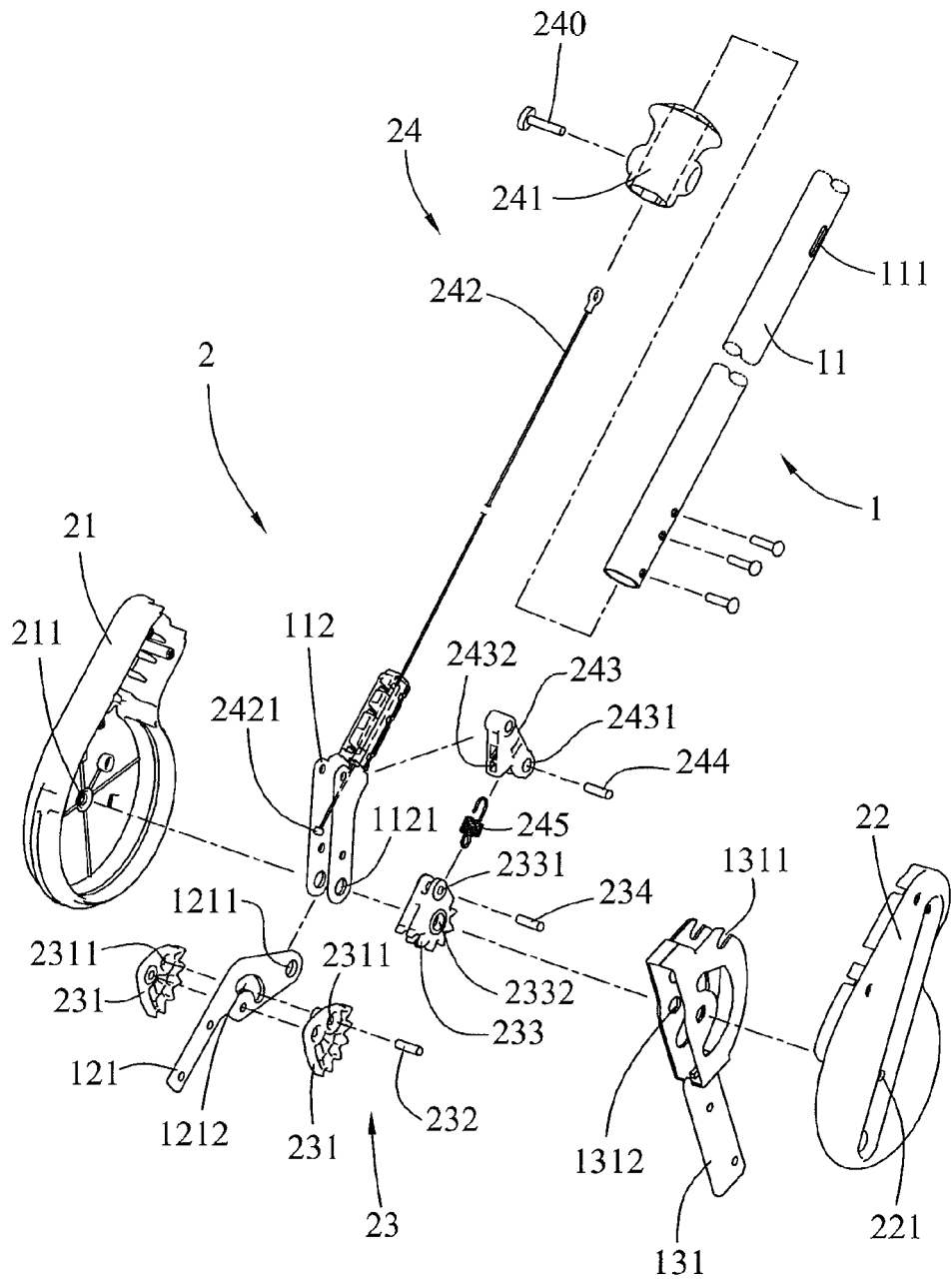
FIG. 2 is a partially exploded perspective view of the stroller as shown in FIG. 1.
Figure 4:
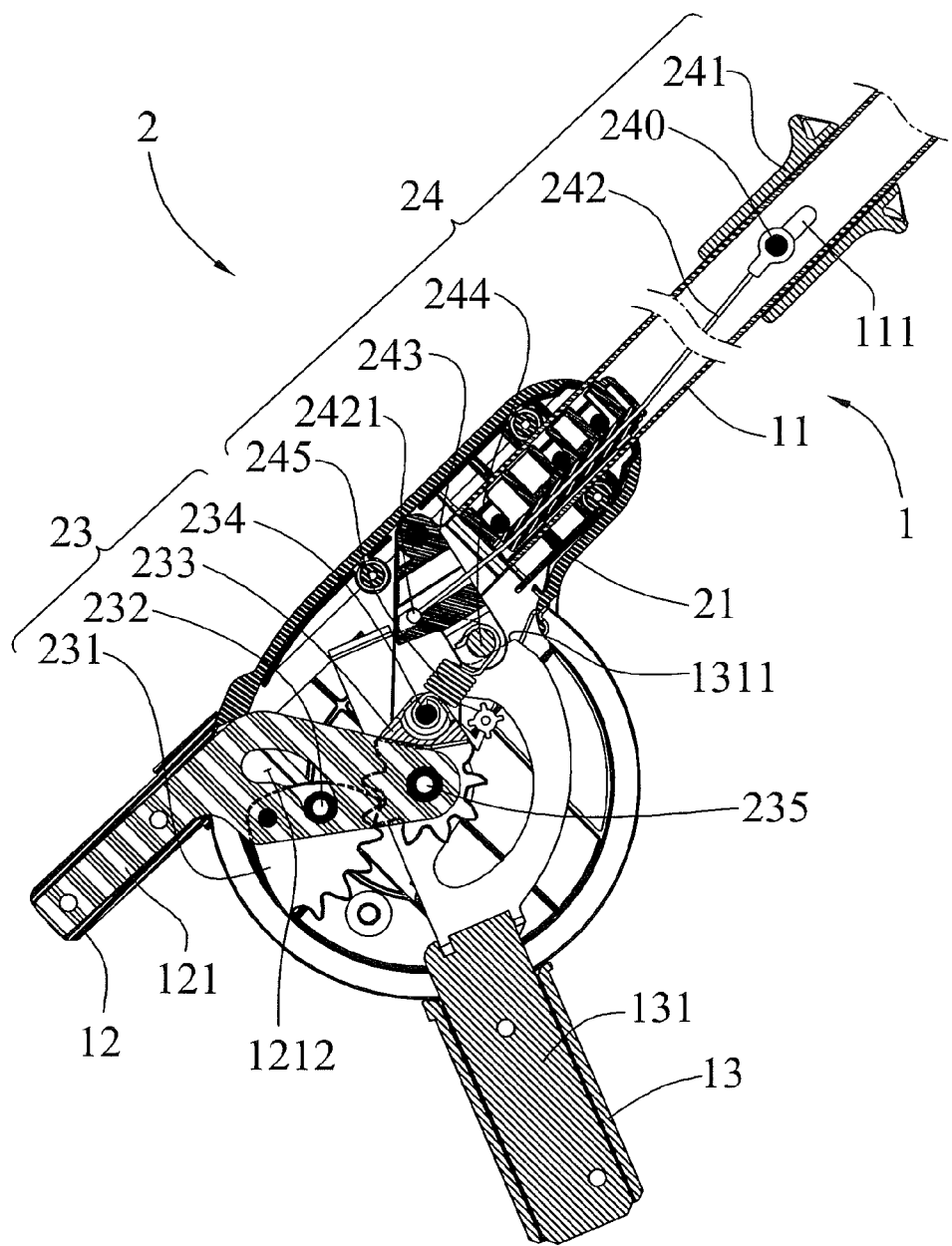
FIG. 4 is a side cross-sectional assembly view of the stroller as shown in FIG. 2.

In assembly, referring to FIG. 4 with reference to FIGS. 1 and 2, the connecting rod 232 of each of the folding devices 2 is extended through the through hole 2311 of each of the first toothed members 231 and the guide slot 1212 of the lower connecting member 121. Then, the lower connecting member 121 of the lower support frame 12 is extended into the second toothed member 233 of each of the folding devices 2, with the lower connecting hole 1211 of the lower connecting member 121 aligning with the pivot hole 2332 of the second toothed member 233 of each of the folding devices 2. Then, the fixing rod 234 of each of the folding devices 2 is extended through the apertures 2331 of the second toothed member 233. Then, the second toothed member 233 of each of the folding devices 2 is extended into the upper connecting member 112 of the upper support frame 11, with the lower connecting hole 1211 of the lower connecting member 121 aligning with the pivot hole 2332 of the second toothed member 233 of each of the folding devices 2 and aligning with the upper connecting hole 1121 of the upper connecting member 112. Then, a pivot rivet 235 is extended through the through bore 221 of the second shell 22 of each of the folding devices 2, the rear connecting hole 1312 of the rear connecting member 131, the upper connecting hole 1121 of the upper connecting member 112, the pivot hole 2332 of the second toothed member 233 of each of the folding devices 2 and the lower connecting hole 1211 of the lower connecting member 121 and is secured in the fixing bore 211 of the first shell 21 of each of the folding devices 2. Thus, the pivot rivet 235 functions as a pivot fulcrum of each of the folding devices 2. Then, the locking rod 244 of each of the folding devices 2 is inserted into the fixing hole 2431 of the locking member 243. Then, the locking member 243 of each of the folding devices 2 is extended into the upper connecting member 112 of the upper support frame 11, with the locking rod 244 being locked in the locking recess 1311 of the rear connecting member 131. Then, the drive wire 242 of each of the folding devices 2 is extended through the upper connecting member 112 of the upper support frame 11 and the passage 2432 of the locking member 243 into the upper support frame 11 of the frame unit 1, with the retaining member 2421 of the drive wire 242 abutting the locking member 243. Then, the pull member 241 of each of the folding devices 2 is mounted on the upper support frame 11 of the frame unit 1 and aligned with the elongate slot 111 of the upper support frame 11. Then, the fastening member 240 is extended through the pull member 241, the elongate slot 111 of the upper support frame 11 and the second end of the drive wire 242 so that the second end of the drive wire 242 of each of the folding devices 2 is connected with the pull member 241 by the fastening member 240. Finally, the tension spring 245 of each of the folding devices 2 is secured on the fixing rod 234 of the gear set 23 and the locking rod 244 to accomplish assembly of each of the folding devices 2.

Figure 5:
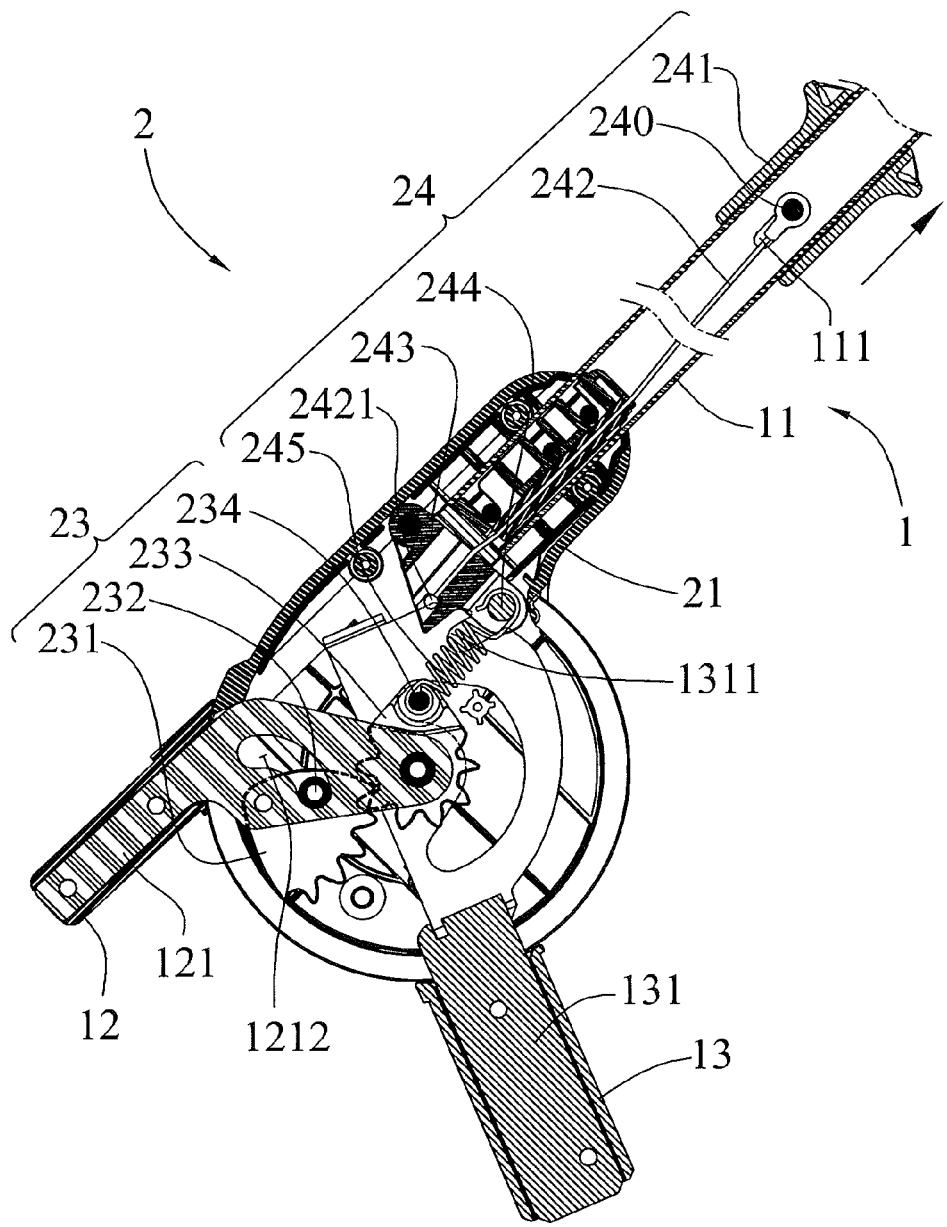
FIG. 5 is a schematic operational view of the stroller as shown in FIG. 4.
Figure 6:
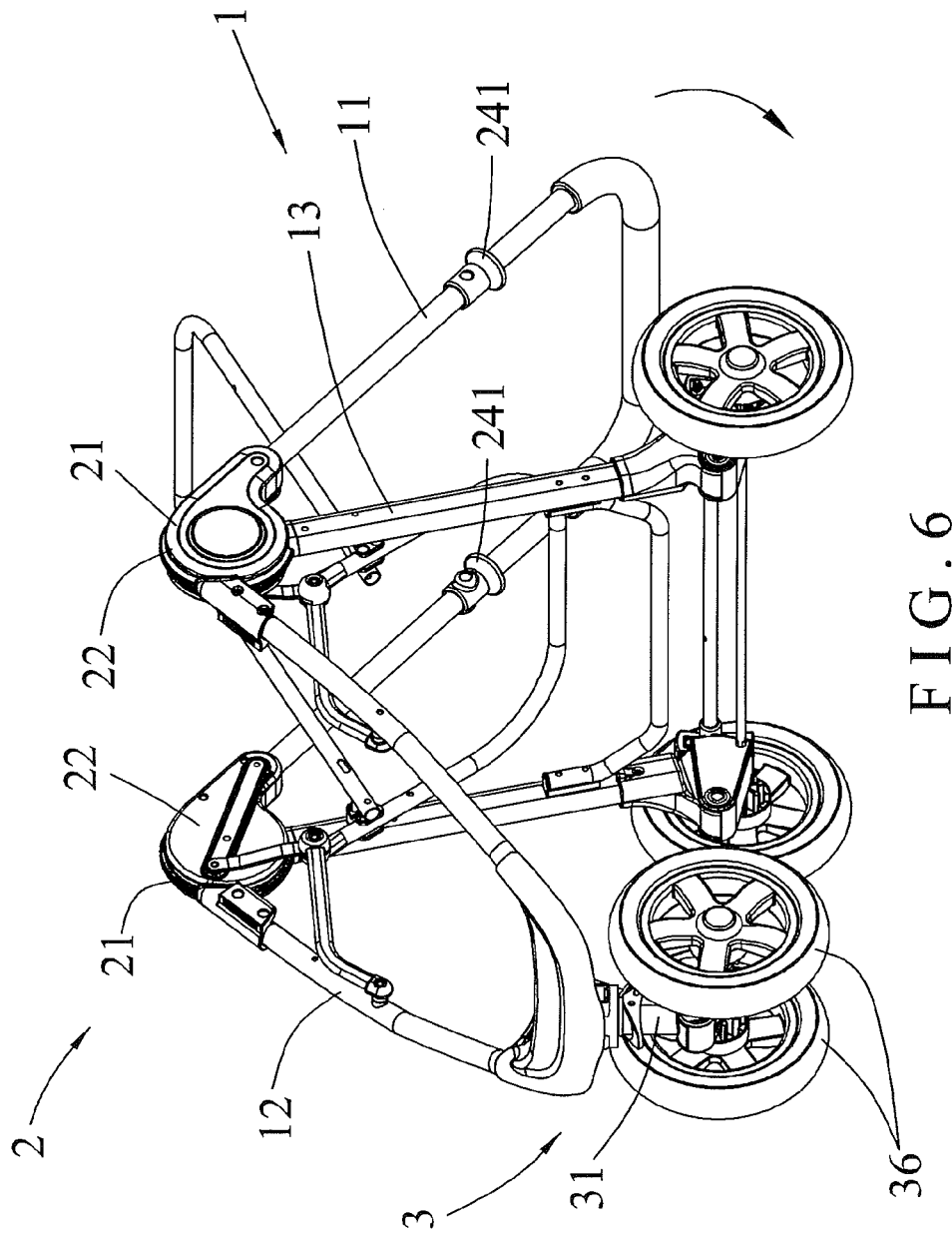
FIG. 6 is a schematic operational view of the stroller as shown in FIG. 1.
Figure 7:
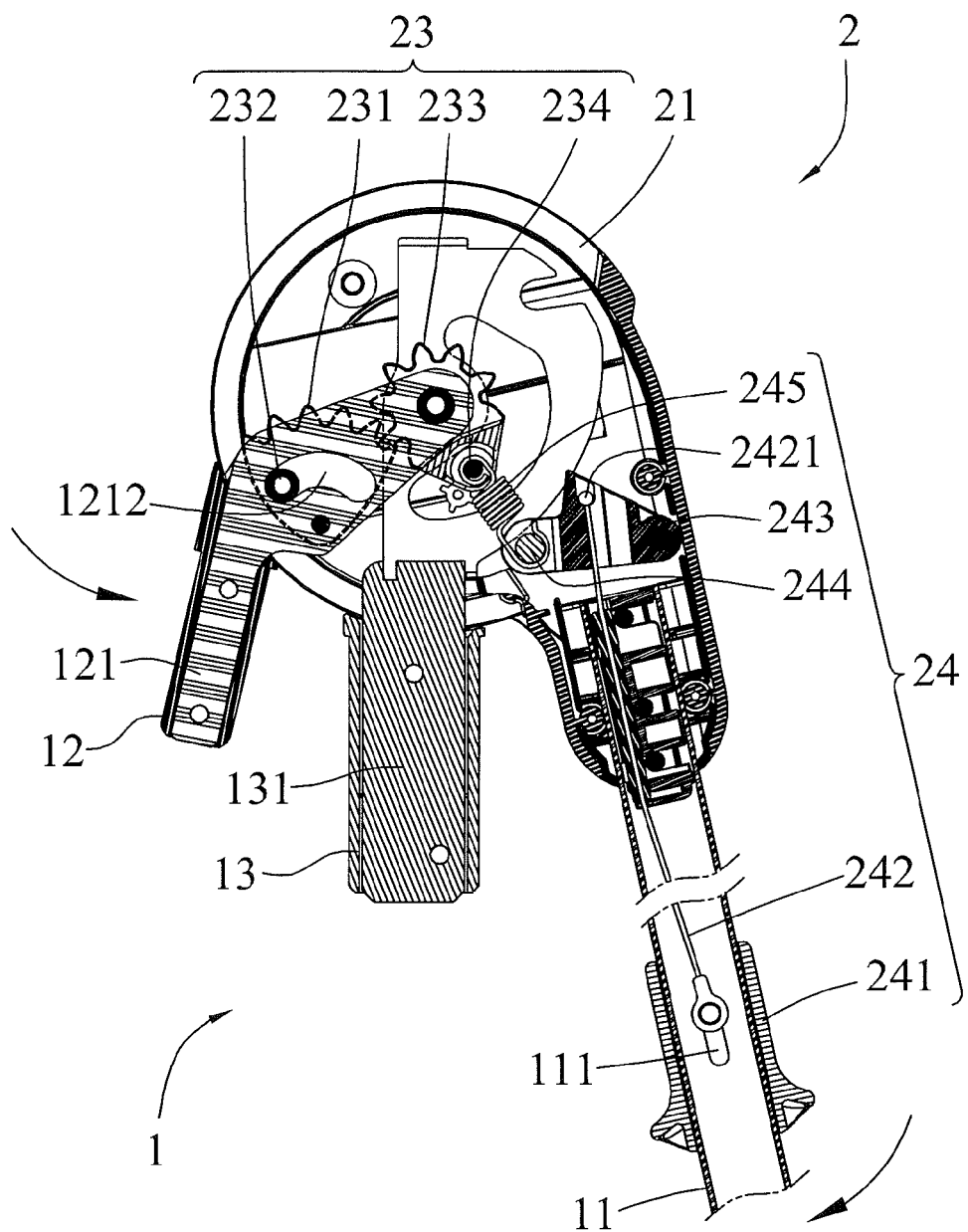
FIG. 7 is a schematic operational view of the stroller as shown in FIG. 5.
Figure 8:
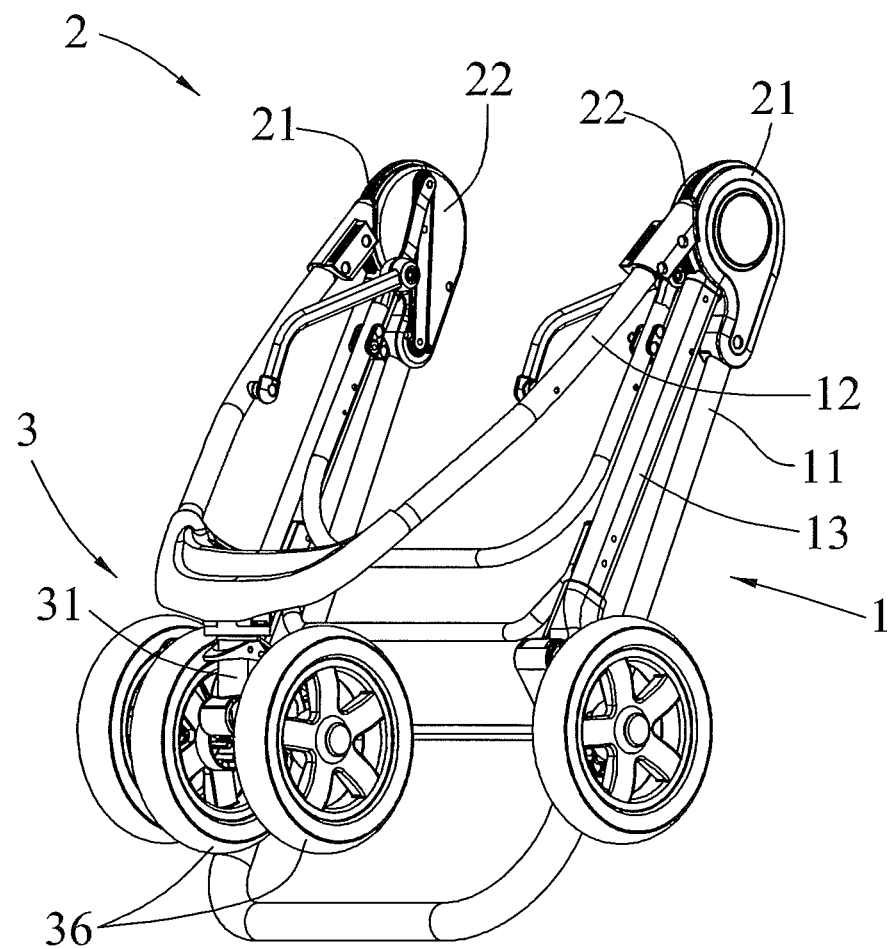
FIG. 8 is a schematic operational view of the stroller as shown in FIG. 6.

In operation, referring to FIGS. 4-8 with reference to FIGS. 1 and 2, when the pull member 241 of each of the folding devices 2 is pulled upward as shown in FIG. 5, the drive wire 242 of each of the folding devices 2 is pulled to move the locking member 243 which drives the locking rod 244 to detach from the locking recess 1311 of the rear connecting member 131 so that the second toothed member 233 and the first toothed members 231 of each of the folding devices 2 are released and can be rotated freely, and the upper support frame 11 and the lower support frame 12 of the frame unit 1 are unlocked and can be pivoted freely. In such a manner, when the upper support frame 11 and the lower support frame 12 of the frame unit 1 are pressed, the upper support frame 11 and the lower support frame 12 of the frame unit 1 are moved downward relative to the rear support frame 13 and are moved from the position as shown in FIG. 1 through the position as shown in FIG. 6 to the position as shown in FIG. 8 so that the upper support frame 11 and the lower support frame 12 of the frame unit 1 are folded. At this time, when the second toothed member 233 and the first toothed members 231 of each of the folding devices 2 are rotated in concert with each other, the connecting rod 232 of each of the folding devices 2 is slidable in the guide slot 1212 of the lower connecting member 121 from the position as shown in FIG. 5 to the position as shown in FIG. 7 to guide rotation of the second toothed member 233 and the first toothed members 231 of each of the folding devices 2 so that the second toothed member 233 and the first toothed members 231 of each of the folding devices 2 are rotated smoothly and stably.

Figure 3:
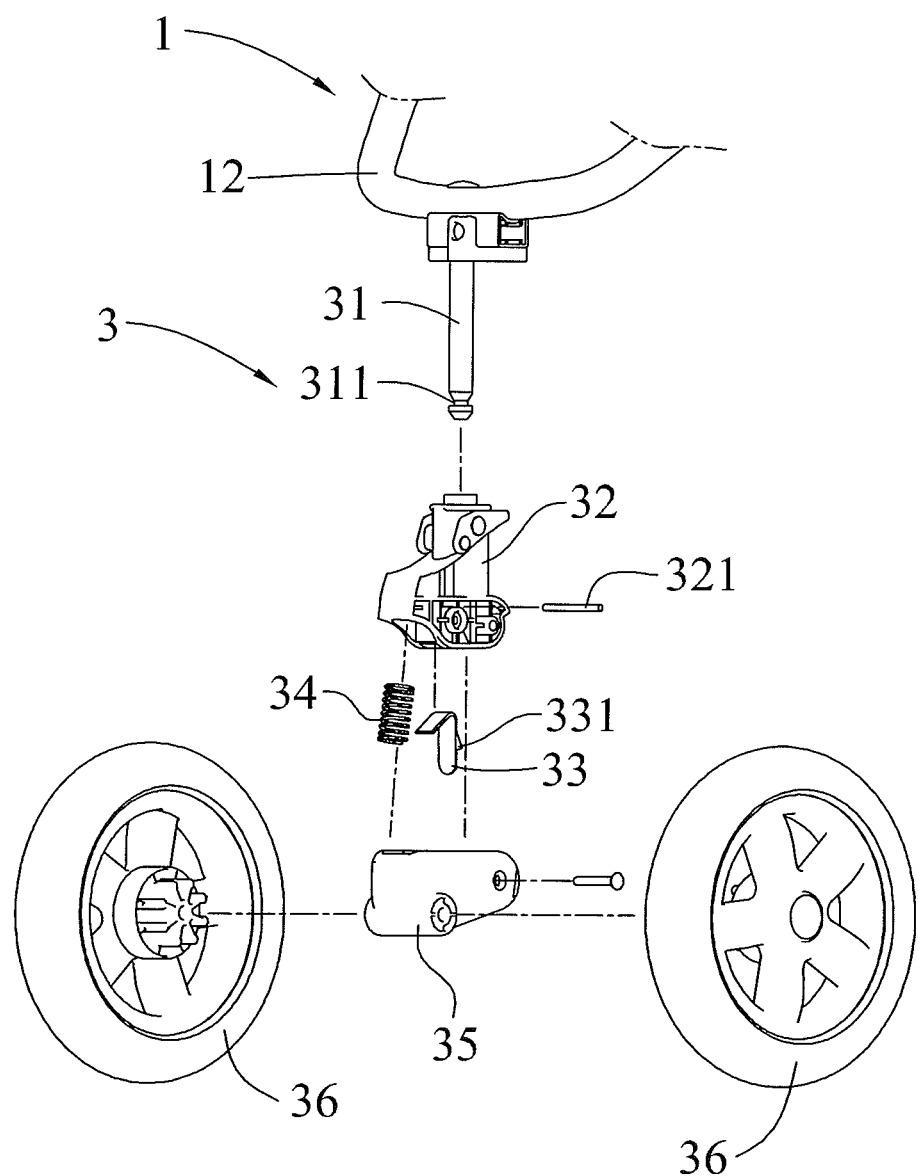
FIG. 3 is a partially exploded perspective view of the stroller as shown in FIG. 1.
Figure 9:
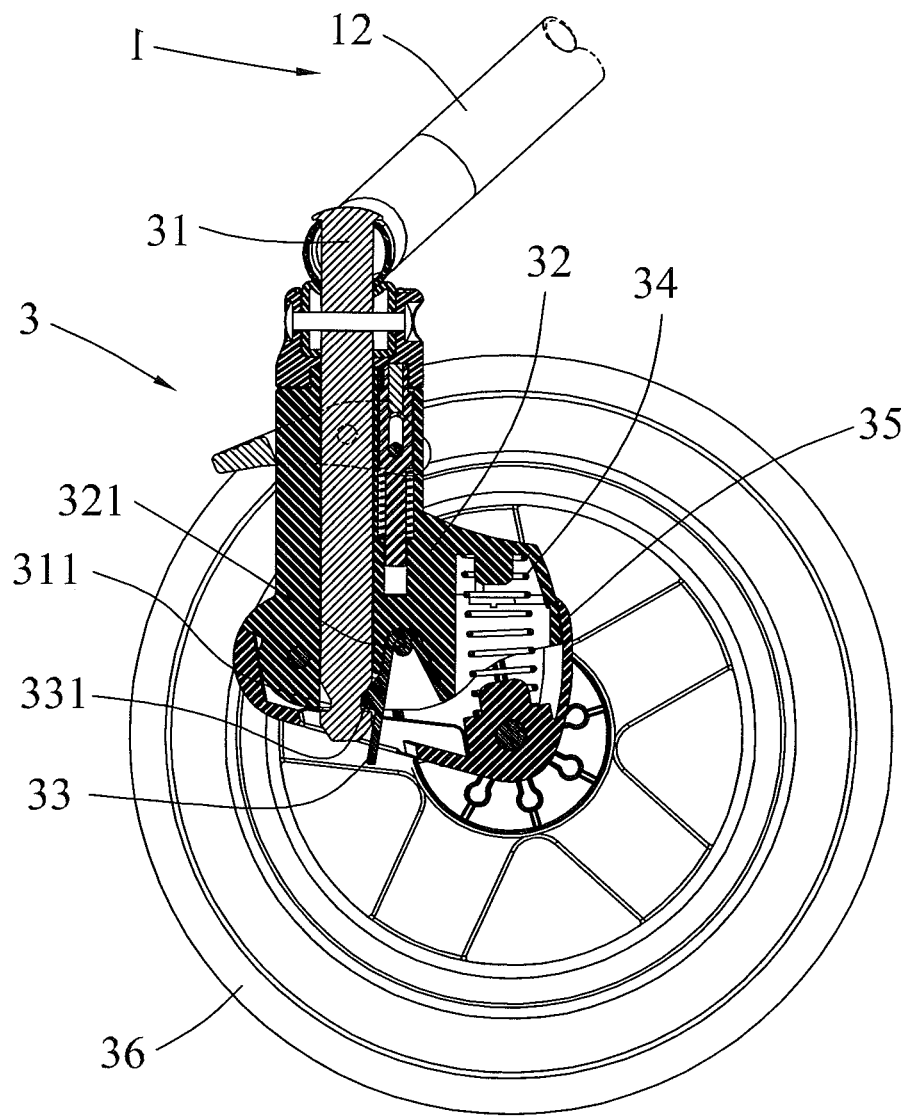
FIG. 9 is a side cross-sectional assembly view of the stroller as shown in FIG. 3.

Referring to FIGS. 3 and 9, the mounting seat 32 is mounted on the main shaft 31. Then, the elastic plate 33 is extended into the mounting seat 32, and the locking piece 331 of the elastic plate 33 is locked in the locking groove 311 of the main shaft 31 to lock the mounting seat 32 onto the main shaft 31. Then, a limit bar 321 is extended into the mounting seat 32 and abuts the elastic plate 33 to limit the elastic plate 33 on the mounting seat 32. At this time, the elastic plate 33 partially protrudes outward from the mounting seat 32 as shown in FIG. 9. Then, the buffering spring 34 is received in the mounting seat 32, and the wheel bracket 35 is mounted on the mounting seat 32 so that the buffering spring 34 is biased between the mounting seat 32 and the wheel bracket 35. Finally, the front wheels 36 are mounted on the wheel bracket 35 to accomplish assembly of the wheel unit 3.

Figure 10:
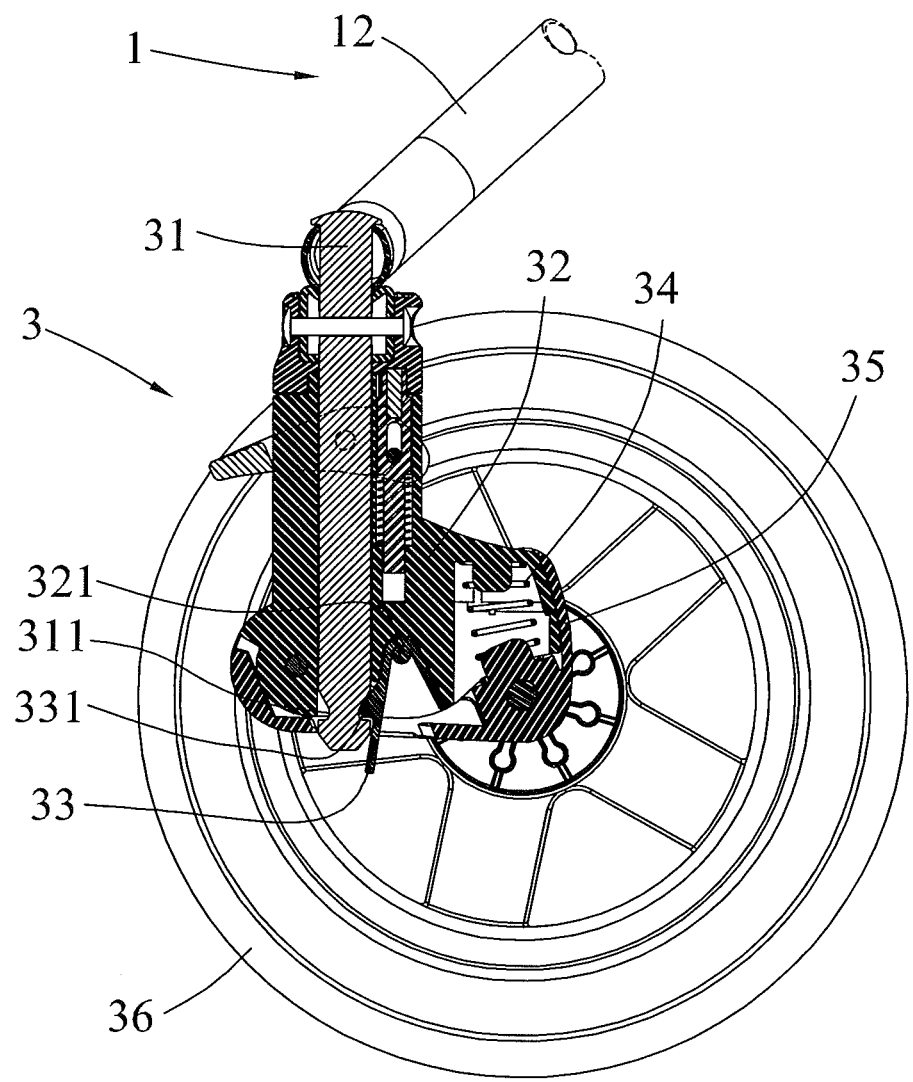
FIG. 10 is a schematic operational view of the stroller as shown in FIG. 9.

Referring to FIGS. 9 and 10, when the front wheels 36 are subjected to a force or vibration, the buffering spring 34 between the mounting seat 32 and the wheel bracket 35 is compressed or extended properly as shown in FIG. 10 to provide a shock-absorbing function to the front wheels 36 so as to reduce the vibration of the front wheels 36 so that the front wheels 36 are moved smoothly and stably.

Figure 11:
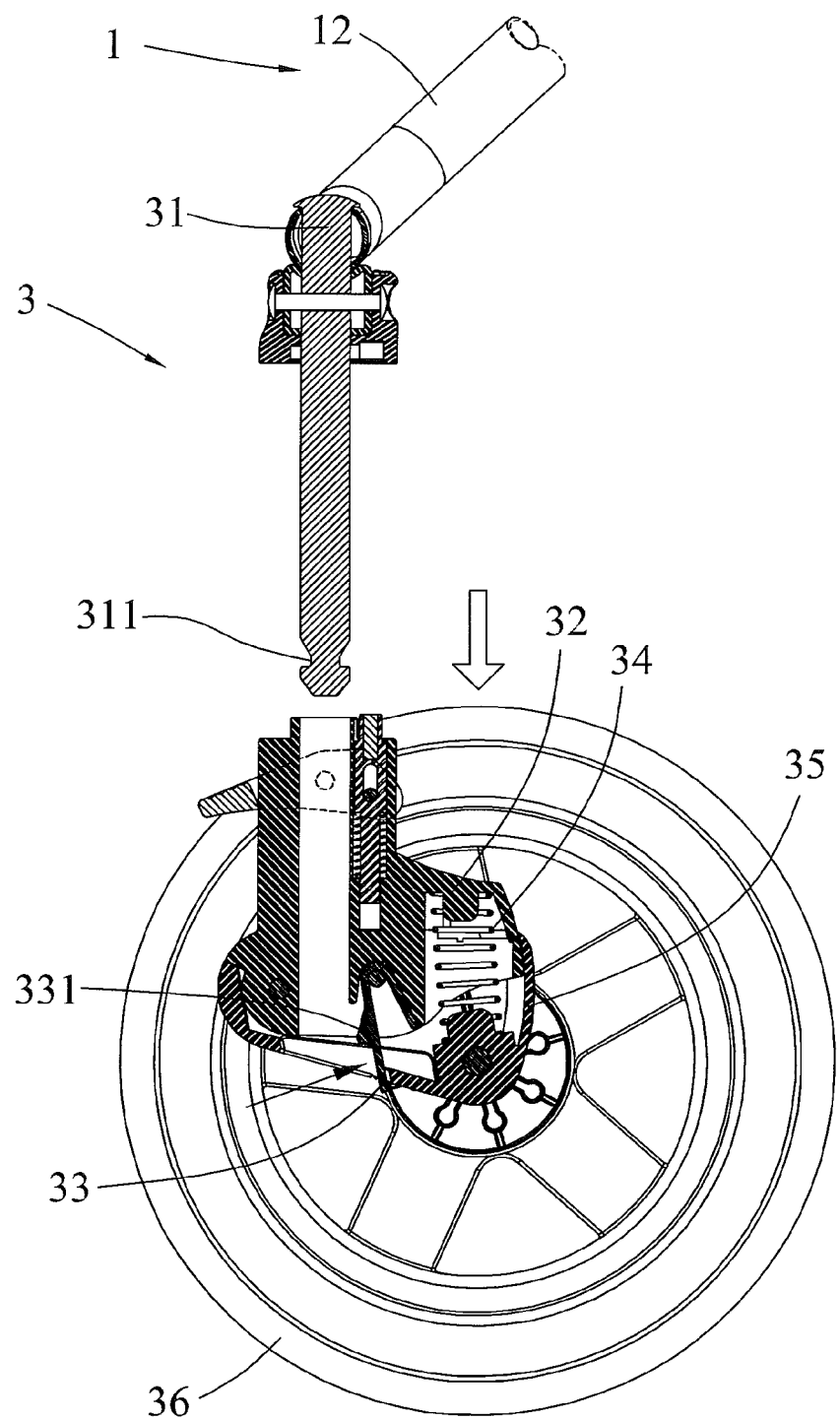
FIG. 11 is an exploded cross-sectional view of the stroller as shown in FIG. 10.

Referring to FIGS. 10 and 11, when the elastic plate 33 is driven forward to detach the locking piece 331 from the locking groove 311 of the main shaft 31 as shown in FIG. 11, the mounting seat 32 is unlocked and can be removed from the main shaft 31, so that the wheel bracket 35 and the front wheels 36 are removed from the lower support frame 12 of the frame unit 1.

Accordingly, when the front wheels 36 are subjected to a force or vibration suddenly, the buffering spring 34 between the mounting seat 32 and the wheel bracket 35 is compressed to provide a shock-absorbing function to the front wheels 36 so as to reduce the vibration applied on the front wheels 36 so that the front wheels 36 are moved smoothly and stably. In addition, the front wheels 36 can be detached from the frame unit 1 when not in use, thereby facilitating packaging, transportation and storage of the stroller. Further, the user only needs to push the elastic plate 33 to detach the front wheels 36 from the frame unit 1 so that the front wheels 36 can be detached from the frame unit 1 easily and quickly. Further, the user only needs to pull the pull member 241 of each of the folding devices 2 to unlock and collapse the upper support frame 11 and the lower support frame 12 so as to fold the frame unit 1 so that the frame unit 1 can be folded easily and quickly. Further, when the second toothed member 233 and the first toothed members 231 of each of the folding devices 2 are rotated in concert with each other, the connecting rod 232 of each of the folding devices 2 is slidable in the guide slot 1212 of the lower connecting member 121 to guide rotation of the second toothed member 233 and the first toothed members 231 of each of the folding devices 2 so that the second toothed member 233 and the first toothed members 231 of each of the folding devices 2 are rotated smoothly and stably. Further, the first shell 21 and the second shell 22 of each of the folding devices 2 encompass the upper connecting member 112 of the upper support frame 11, the lower connecting member 121 of the lower support frame 12 and the rear connecting member 131 of the rear support frame 13 to prevent the upper support frame 11 and the lower support frame 12 from clamping or hurting the user during the folding process.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:
1. A stroller, comprising:
a frame unit;
two folding devices connected with the frame unit; and
a wheel unit connected with the frame unit;
wherein the frame unit includes:
a rear support frame;
an upper support frame foldably connected with the rear support frame; and
a lower support frame foldably connected with the rear support frame;
the lower support frame of the frame unit has two opposite upper portions each provided with a lower connecting member which has two opposite sides;
the upper support frame of the frame unit has a surface provided with an elongate slot;
each of the folding devices is mounted between the upper support frame, the lower support frame and the rear support frame of the frame unit;
each of the folding devices includes:
a first shell;
a second shell combined with the first shell;
a gear set mounted between the first shell and the second shell; and
a pulling mechanism connected between the upper support frame of the frame unit and the gear set;
the gear set of each of the folding devices includes:
at least two first toothed members mounted on the two opposite sides of the lower connecting member of the lower support frame;
a connecting rod extending through the first toothed members;
a second toothed member meshing with the first toothed members; and
a fixing rod extending through the second toothed member;
the pulling mechanism of each of the folding devices includes:
a locking member mounted between the first shell and the second shell;
a locking rod mounted on the locking member and detachably locked onto the rear support frame of the frame unit;
a tension spring mounted between the second toothed member of the gear set and the locking member and having a first end secured on the fixing rod of the gear set and a second end secured on the locking rod;
a pull member movably mounted on the upper support frame of the frame unit;
a drive wire having a first end provided with a retaining member abutting the locking member and a second end attached to the pull member; and
a fastening member extended through the pull member, the elongate slot of the upper support frame and the second end of the drive wire;

the second end of the drive wire of the pulling mechanism of each of the folding devices is connected with the pull member by the fastening member;

the fastening member is slidable in the elongate slot of the upper support frame to guide movement of the pull member on the upper support frame of the frame unit;

when the upper support frame and the lower support frame of the frame unit are folded relative to the rear support frame of the frame unit, the first toothed members and the second toothed member of the gear set of each of the folding devices are rotated in concert with each other;

the wheel unit is mounted on a lower portion of the lower support frame of the frame unit;

the wheel unit includes:

a main shaft secured on the lower support frame of the frame unit and having a lower end provided with a locking groove;

a mounting seat removably mounted on the main shaft;

an elastic plate mounted on a bottom of the mounting seat and having a side provided with a locking piece detachably locked in the locking groove of the main shaft;

a wheel bracket mounted on a lower portion of the mounting seat;

a buffering spring mounted in the mounting seat and biased between the mounting seat and the wheel bracket; and two front wheels mounted on two opposite sides of the wheel bracket;

when the locking piece of the elastic plate is detached from the locking groove of the main shaft, the mounting seat is removed from the main shaft, so that the wheel bracket and the front wheels are removed from the lower support frame of the frame unit.

2. The stroller of claim 1, wherein the rear support frame of the frame unit has two opposite upper portions each provided with a rear connecting member;

the rear connecting member of the rear support frame has a periphery provided with at least one locking recess;

the locking rod of the pulling mechanism of each of the folding devices is detachably locked in the locking recess of the rear connecting member of the rear support frame.

* * * * *